US005469339A

United States Patent [19]

Iiyama et al.

[11] Patent Number: 5,469,339

[45] Date of Patent: Nov. 21, 1995

[54] RECTANGULAR REFLECTOR CAPABLE OF AVOIDING SECONDARY REFLECTION BY SIDE WALLS

[75] Inventors: Katsuhiko Iiyama; Naoki Uchida, both of Shizuoka, Japan

[73] Assignee: Koito Manufacturing Co., Ltd., Tokyo, Japan

[21] Appl. No.: 113,108

[22] Filed: Aug. 30, 1993

[30] Foreign Application Priority Data

Sep. 4, 1992 [JP] Japan .................................... 4-260632

[51] Int. Cl.$^6$ ...................................................... B60Q 1/04

[52] U.S. Cl. ............................ 362/61; 362/297; 362/346

[58] Field of Search ............................ 362/61, 297, 298, 362/346, 347, 348

[56] References Cited

U.S. PATENT DOCUMENTS

| | | | |
|---|---|---|---|
| 981,290 | 1/1911 | Lebby | 362/297 |
| 3,492,474 | 1/1970 | Yamaguchi et al. . | |
| 4,731,713 | 3/1988 | Perthus . | |
| 4,803,601 | 2/1989 | Collot et al. . | |
| 4,811,174 | 3/1989 | Kanzler et al. | 362/347 |
| 5,003,435 | 3/1991 | Nakata | 362/346 |
| 5,034,867 | 7/1991 | Mayer | 362/297 |

FOREIGN PATENT DOCUMENTS

| | | |
|---|---|---|
| 3127250 | 1/1983 | Germany . |
| 50-127487 | 10/1975 | Japan . |

*Primary Examiner*—Ira S. Lazarus
*Assistant Examiner*—Y. Quach
*Attorney, Agent, or Firm*—Sughrue, Mion, Zinn, Macpeak & Seas

[57] ABSTRACT

A reflector consists of a reflecting portion and a wall portion surrounding it and is rectangular when viewed from the front side. A reference curve is formed on a horizontal plane including the optical axis by connecting outer portions of a parabola having a focus F1 located on the optical axis and a focal length f1, and portions of two parabolas having foci F2 and F2' located on their axes parallel with the optical axis and a focal length f2 (>f1). A reflecting surface is formed as a collection of cross-sectional curves each obtained by cutting an imaginary paraboloid of revolution set for each point on the reference curve and having an axis extending along a ray reflected at that point after being emitted from the focus F1 by a vertical plane including the axis of the paraboloid of revolution.

12 Claims, 8 Drawing Sheets

RECTANGULAR REFLECTOR CAPABLE OF AVOIDING SECONDARY REFLECTION BY SIDE WALLS

BACKGROUND OF THE INVENTION

The present invention relates to a reflector for a vehicular lamp having a rectangular front view.

Among vehicular headlights, fog lamps, etc. are ones that are rectangular when viewed from the front side. FIGS. 12 and 13 show a reflector a as an example of such a type. As shown in FIG. 12, the reflector a consists of a reflecting portion b and walls c surrounding it. (FIG. 12 shows right and left side walls.) As shown in FIG. 13, when viewed from the front side, the reflector a has a rectangular shape that is long in the horizontal direction.

A circular bulb fixing hole d is formed at a, center portion of the reflecting portion b. The optical axis passing through the center O and extending in the front-rear direction is selected as the x-axis. The y-axis is perpendicular to the x-axis and extends in the horizontal direction, and the z-axis is perpendicular to the x-axis and extends in the vertical direction.

A reflecting surface e, which is the inside surface of the reflecting portion b, may have a shape as disclosed in, for instance, Japanese Patent Application Unexamined Publication No. Sho. 50-127487. The reflecting surface e is more diffusive in the horizontal direction than a paraboloid-of-revolution reflecting surface. That is, as indicated by light rays 1 in FIG. 12, a light ray emitted from a point light source located at a focus F on the optical axis and reflected at a point on the reflecting surface e more distant from the optical axis is more diffused, i.e., goes away from the optical axis at a higher rate.

However, the above reflector a is associated with various problems as exemplified below. As indicated by light rays m in FIG. 12, rays reflected at points on the reflecting surface e close to the side walls c are again reflected by the side walls c, and may cause glare. Since the effective area of the reflecting surface e is narrowed to an area A shown in FIG. 12 (that is, rays reflected by an area B are ineffective), it is difficult to further increase the horizontal diffusion.

The above problems result from the fact that a light ray originating from the focus F and reflected at a point on the reflecting surface e more distant from the optical axis is more diffused in the horizontal direction. In order to reduce the ineffective area B, the right and left side walls c need to be inclined greatly with respect to the vertical plane including the optical axis.

Further, since rays reflected by the area A are diffused in the horizontal direction without crossing the optical axis, if the bulb fixing hole d occupies a large area relative to the reflecting surface area, the light quantity may be lowered at a central portion of the light distribution pattern.

FIG. 14 schematically shows how this problem occurs. In FIG. 14, H—H and V—V represent a horizontal line and a vertical line, respectively, and o represents an intersecting point of those lines. Character f represents two relatively bright regions extending along the horizontal line H—H which are projected by respective areas obtained by halving the reflecting surface e by the vertical plane including the optical axis. A portion D (indicated by a dashed line in FIG. 14) located in the vicinity of the point o and between the regions f tends to be relatively dark due to the influence of the bulb fixing hole e.

SUMMARY OF THE INVENTION

An object of the present invention is to provide a novel reflector for a vehicular lamp such as a fog lamp having a rectangular front view which reflector has no ineffective reflecting area in forming a light distribution pattern and can well match the important factors of horizontal diffusion and central brightness.

According to the invention, in a reflector for a vehicular lamp which has a reflecting surface and a wall portion surrounding it and is generally rectangular when viewed from a front side, the reflecting surface is defined by:

- a reference curve located on a horizontal plane including an optical axis of the reflecting surface and formed by connecting parts of a plurality of parabolas having different focus positions under the firsts order continuity condition, the parabola closer to the optical axis having a longer focal length;
- a reference focus being located at the focus position of one of the parabolas having a shortest focal length; and
- a quadratic cross-sectional curve obtained by cutting the reflecting surface by a vertical plane including a direction vector of a ray reflected from each point on the reference curve after being emitted from the reference focus.

DESCRIPTION OF THE PREFERRED EMBODIMENT

A reflector for a vehicular lamp according to an embodiment of the present invention is described hereinafter with reference to the accompanying drawings.

Figure 1:
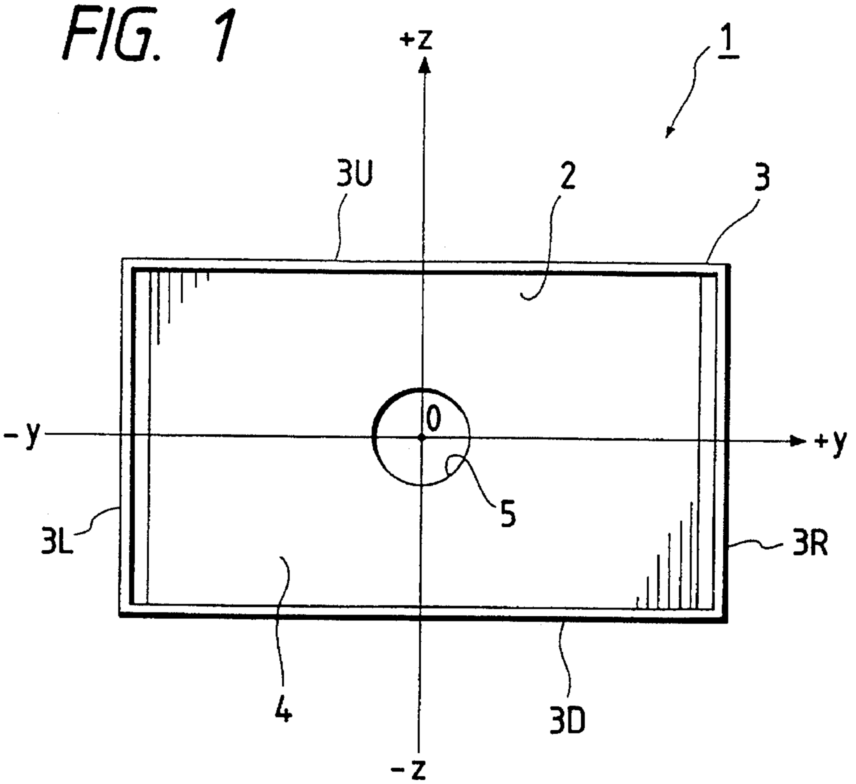
FIG. 1 is a front view of a reflector according to the present invention.

FIG. 1 is a front view of a reflector 1 according to the invention. The reflector 1 consists of a reflecting portion 2 and a wall portion 3 surrounding it. When viewed from the front side, the reflecting portion 2 has a rectangular shape that is long sideways. A reflecting surface 4 is formed by applying a reflection treatment to the inside surface of the reflecting portion 2. A circular hole 5 through which a bulb is fixed is formed at a central portion of the reflecting portion 2.

A coordinate system for the reflecting surface 2 is defined such that the x-axis passes through the center of the circular hole 5 and extends perpendicularly to the paper surface of FIG. 1, the y-axis is perpendicular to the x-axis and extends in the horizontal direction, and the z-axis is perpendicular to the x-axis and extends in the top-bottom direction. The origin of this orthogonal coordinate system is represented by O.

The reflecting surface 4 is obtained as a collection of parabolas that are set for respective points on a reference curve on the horizontal plane including the optical axis (i.e., x-axis) so that the horizontal ray diffusing direction can be controlled continuously. There exists a tendency that rays reflected at points closer to the optical axis are more diffused in the horizontal direction and rays reflected by an area away from the optical axis are subject to almost no diffusion to travel substantially in parallel with the optical axis.

Figure 2:
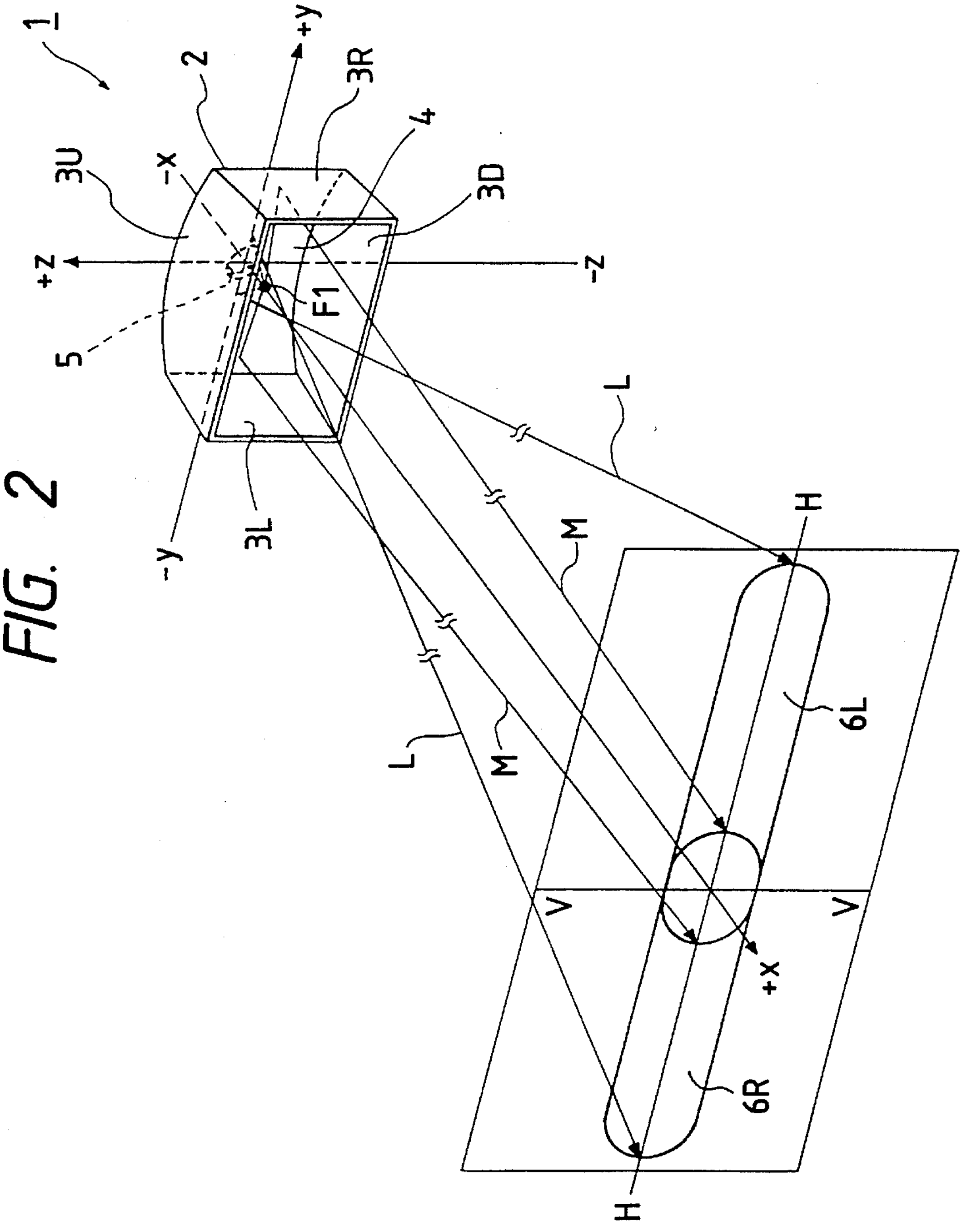
FIG. 2 is a perspective view schematically showing a relationship between the reflector of the invention and its projection pattern.

FIG. 2 schematically shows a pattern projected onto a screen sufficiently away from the reflector 1 when a light source is placed at a focus F1 of the reflecting surface 4. In FIG. 2, H—H and V—V represent a horizontal line and vertical line, respectively.

A projection pattern 6L is formed by rays reflected by an area of the reflecting surface 4 located on one side (y<0) of the vertical plane including the optical axis, and a projection pattern 6R is formed by rays reflected by an area located on the other side (y>0) of the same vertical plane.

To form the patterns 6L and 6R, rays reflected at points close to the optical axis are greatly diffused and cross the optical axis (indicated by two rays L) and rays reflected at points away from the optical axis are subjected to almost no diffusion (indicated by two rays M).

Top and bottom walls 3U and 3D of the wall portion 3 are flat plates parallel with each other, and right and left side walls 3R and 3L are shaped such that their interval increases toward the front.

The shape of the reflecting surface 4 is described below with reference to FIGS. 3–9 illustrating its design procedure.

First, a reference curve consisting of a plurality of curved segments is set in the following manner.

Figure 3:
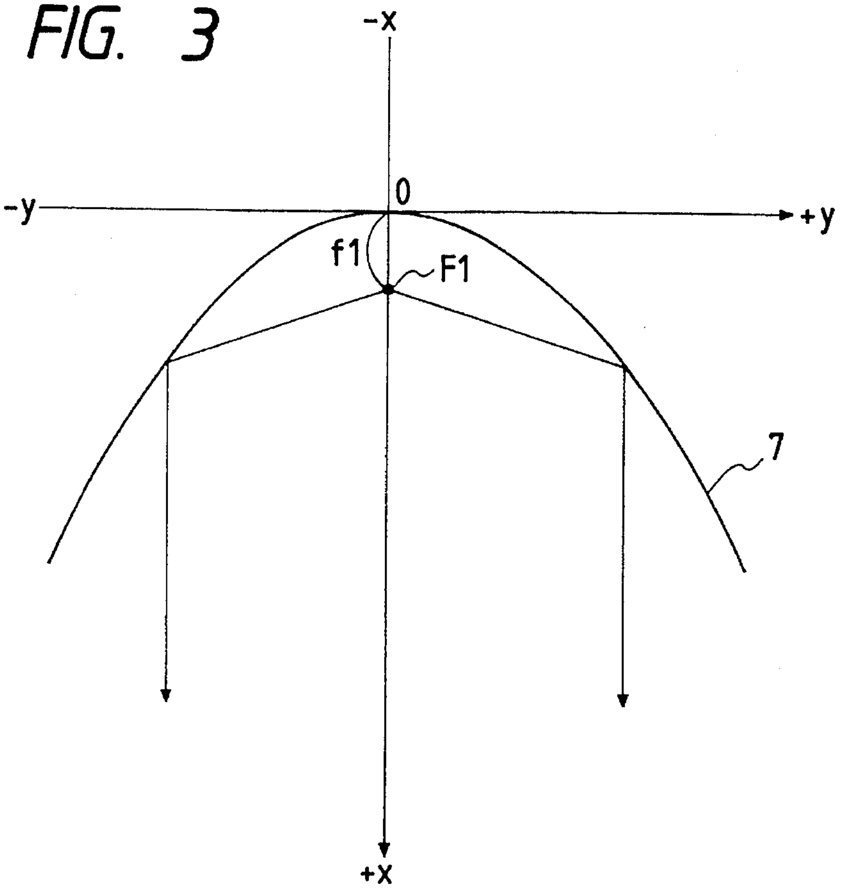
FIG. 3 shows a parabola having a focus F1 and a focal length fl.

As shown in FIG. 3, a parabola 7 having a focus F1 (focal length f1) is drawn on the x-y plane. ($x=y^2/(4.f1)$).

Figure 4:
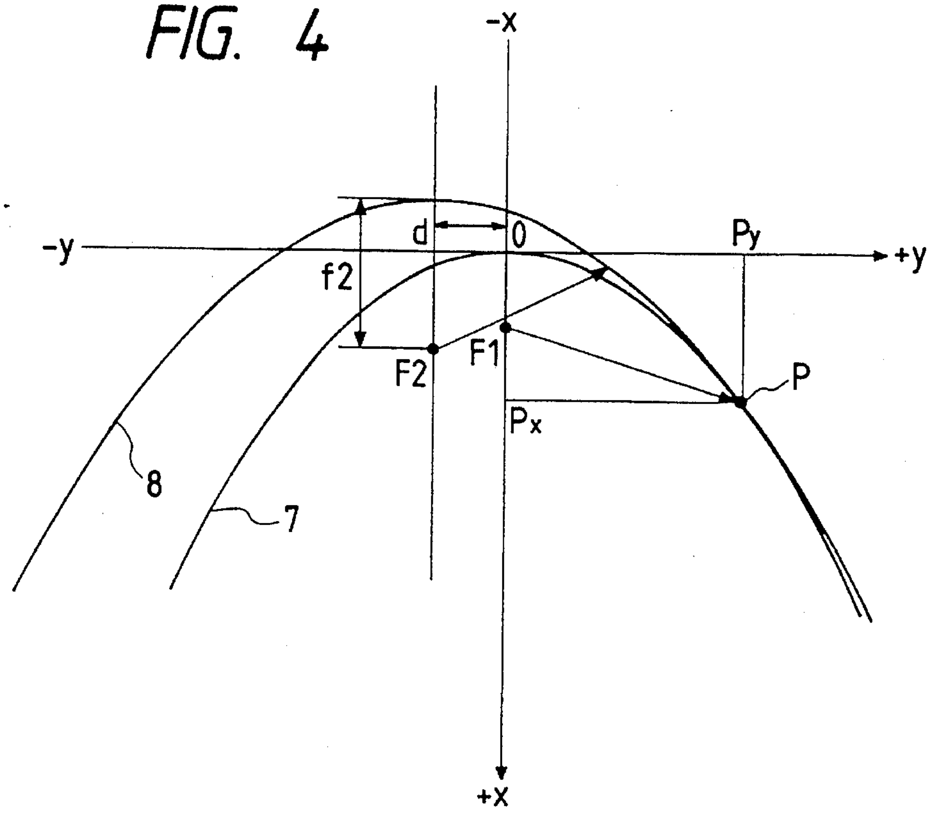
FIG. 4 shows another parabola that is tangent to the parabola of FIG. 3 at a point P.

Then, as shown in FIG. 4, another parabola 8 is drawn such that the parabolas 7 and 8 have a common tangential line (first-order continuity condition) at a point P (x and y coordinates are Px and Py, respectively) on the parabola 7 in the first quadrant of the x-y plane. A focus F2 of the parabola 8 is located on a straight line (y=d (<0)) parallel with the x-axis and a focal length is f2 (>f1)).

Figure 5:
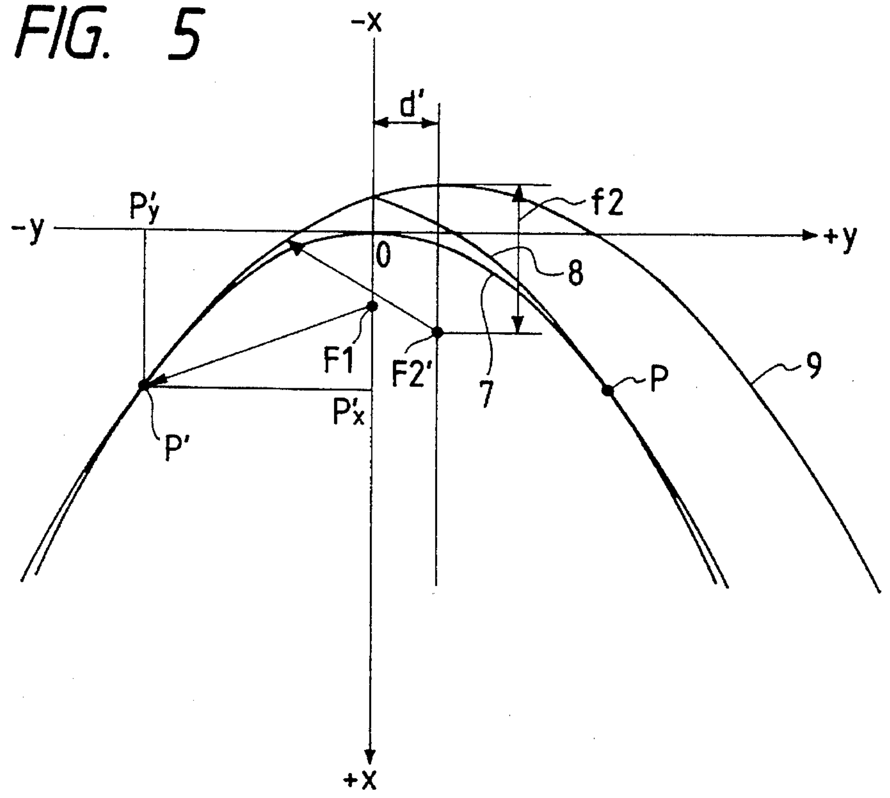
FIG. 5 shows another parabola that is tangent to the parabola of FIG. 3 at a point P'.

As shown in FIG. 5, another parabola 9 is drawn in the same manner such that the parabolas 7 and 9 has a common tangential line at a position P' (x and y coordinates are $P_x'$ and $P_y'$, respectively) on the parabola 7 in the fourth quadrant of the x-y plane. A focus F2' of the parabola 9 is located on a straight line (y=d' (>0) where d'=|d| if the reflection surface 4 is symmetrical with respect to the x-z plane) parallel with the x-axis, and a focal length is f2 (>f1).

Figure 6:
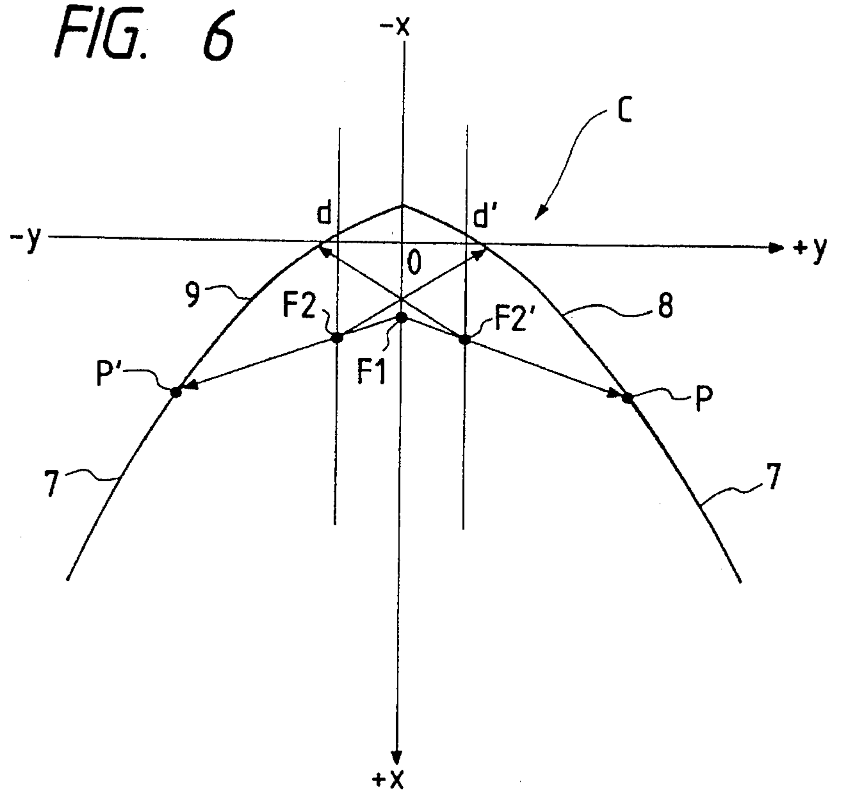
FIG. 6 shows a reference curve.

A reference curve C is obtained by connecting parts of the parabolas 7–9. More specifically, as shown in FIG. 6, the parabola 7 contributes to the reference curve C in the ranges $y<P_y'$ and $y>P_y$, the parabola 9 in the range $P_y'<y<0$, and the parabola 8 in the range $0<y<P_y$.

Figure 7:
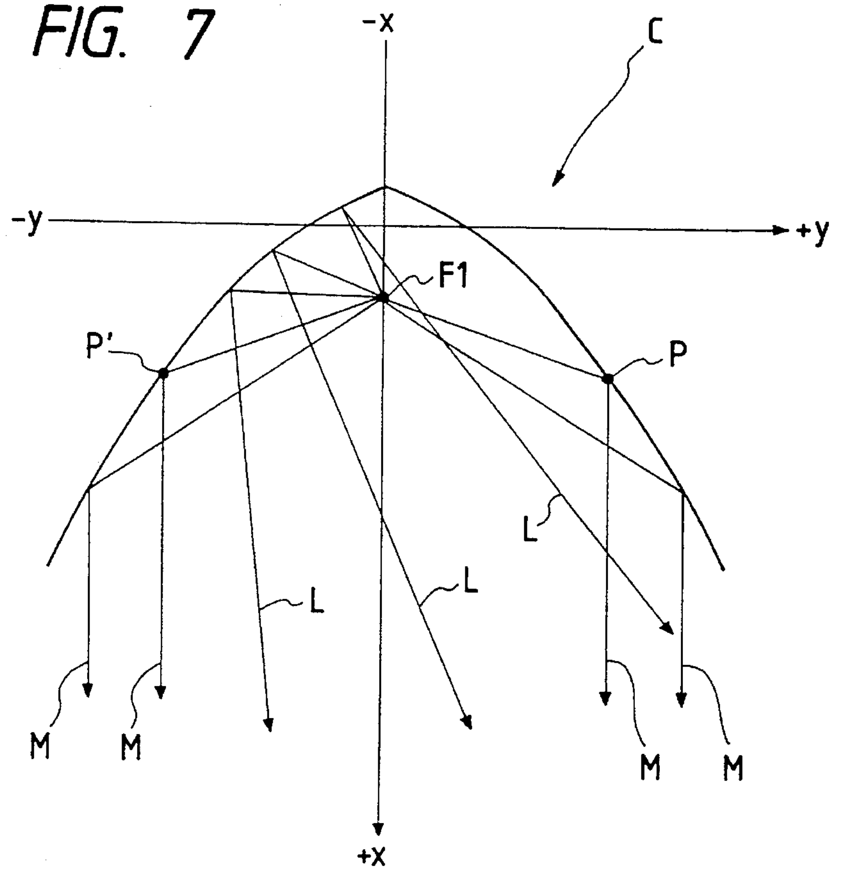
FIG. 7 shows rays reflected at several points on the reference curve.

As is understood from its shape, the reference curve C has an optical action as shown in FIG. 7 when a point light source is placed at the focus F1 (this is a reference focus of the reflecting surface 4). That is, while rays reflected at points on the parabolas 8 and 9 are diffused and cross the optical axis (indicated by rays L only for the parabola 9), rays reflected at points on the parabola 7 travel in parallel with the optical axis (indicated by rays M).

Figure 8:
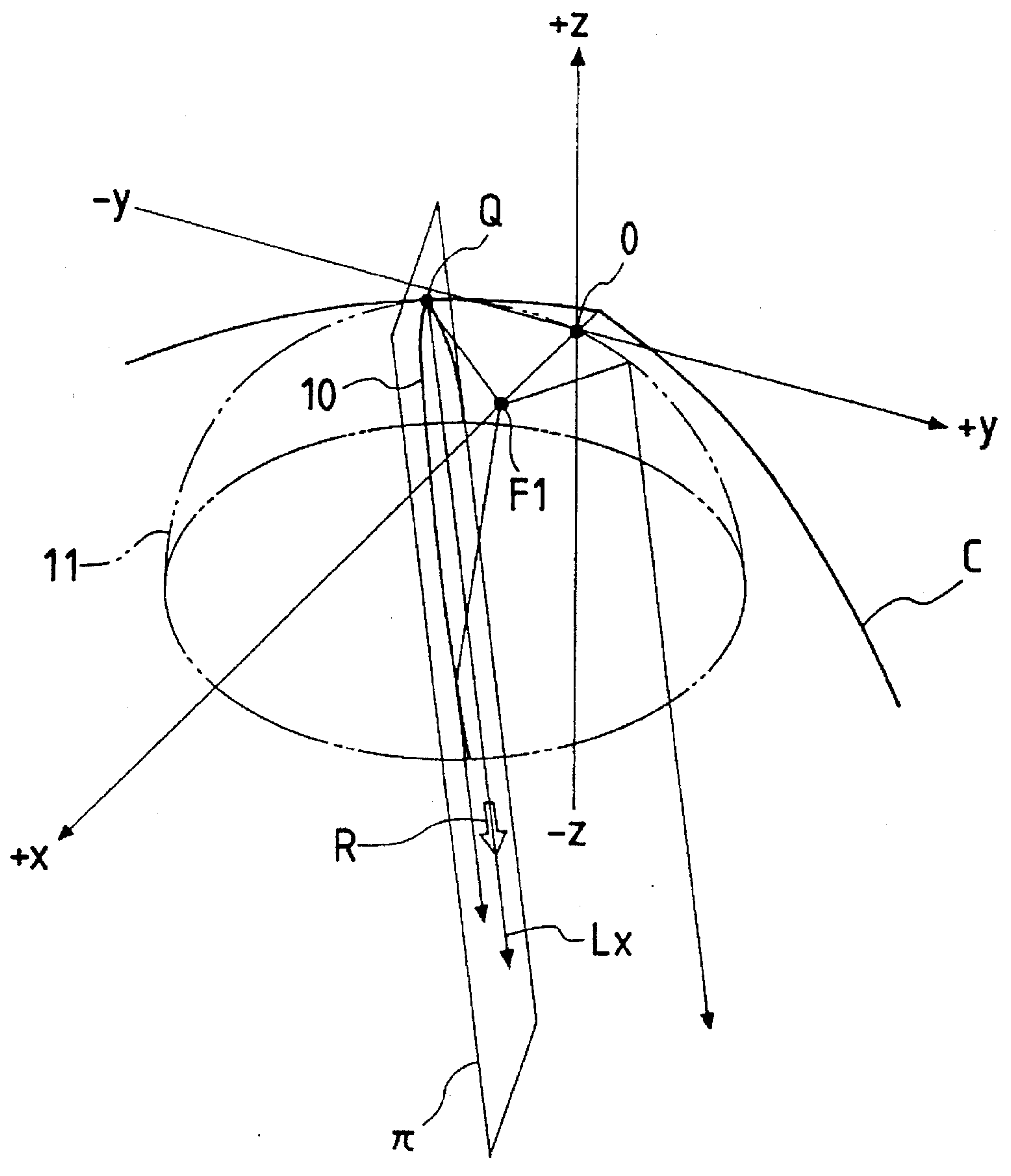
FIG. 8 is a perspective view showing a parabola set for a point on the reference curve and an imaginary paraboloid of revolution including that parabola as its cross-sectional line.

Then, as shown in FIG. 8, the direction (indicated by a light ray vector R) taken by a ray (emitted from the focus F1) after being reflected at an arbitrary point Q on the reference curve C is calculated, and a parabola 10 having an axis $L_x$ that has the vector R as its direction vector is generated for the point Q. The parabola 10 is obtained as a cross-sectional curve when an imaginary paraboloid of revolution 11 having the line $L_x$ as its axis and the point Q as its vertex is cut by a plane $\pi$ including the line $L_x$ and parallel with the z-axis.

Figure 9:
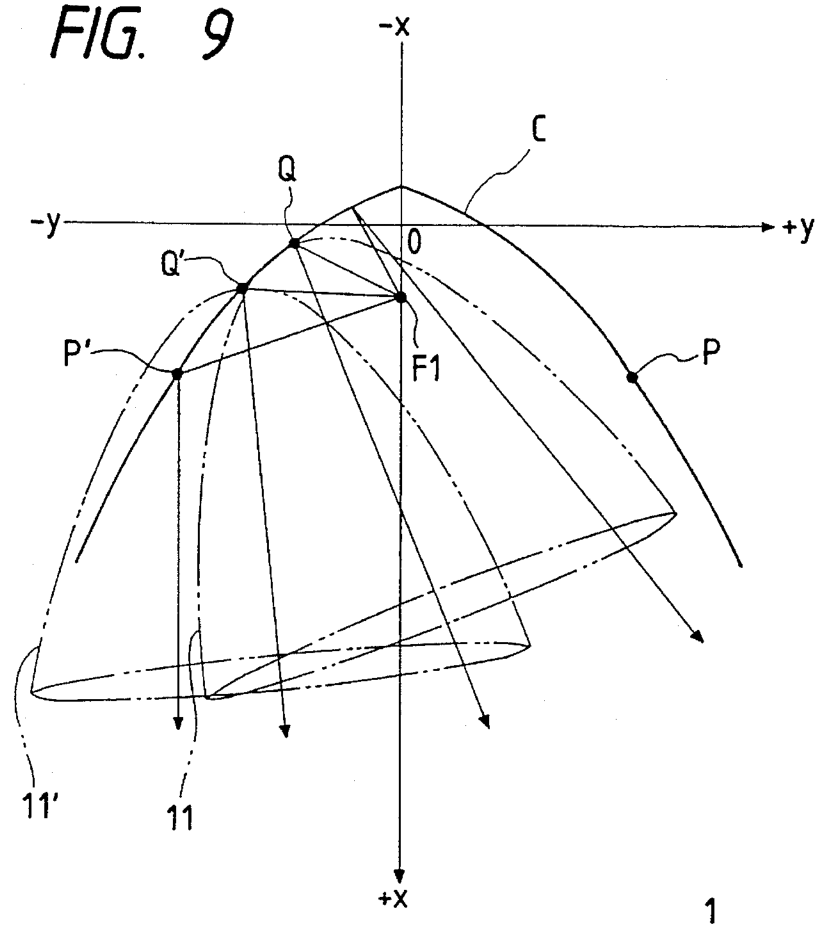
FIG. 9 shows imaginary paraboloid of revolutions for arbitrary points on the reference curve.

An imaginary paraboloid of revolution such as the imaginary paraboloid of revolution 11 is associated with each point on the reference curve C (an imaginary paraboloid of revolution 11' for a point Q' is also shown in FIG. 9). The axis of the imaginary paraboloid of revolution includes the light ray vector of the reflected ray, and a paraboloid for that point is a cross-sectional curve obtained by cutting the paraboloid of revolution by the plane including the axis and parallel with the z-axis.

The reflecting surface 4 is formed as a single, continuous surface of such paraboloids.

As is apparent from the above procedure, since rays reflected at points in the vicinity of the boundary between the reflecting portion 2 and the right and left side walls 3R and 3L travel in parallel with the x-axis, in theory they are not reflected again by the side walls (if a point light source is placed at the focus F1).

Figure 10:
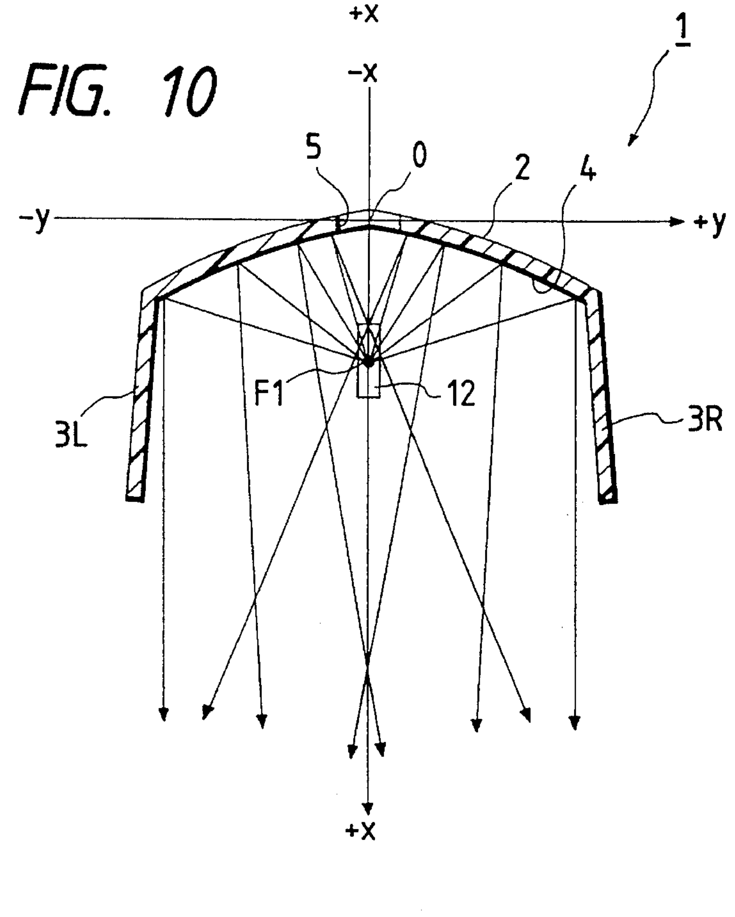
FIG. 10 is a horizontal sectional view of the reflector of the invention.

As mentioned above, actually the side walls 3R and 3L are somewhat inclined from the planes parallel with the x-z plane so that they do not obstacle rays reflected at points in the vicinity of the boundary with the reflecting portion 2 (see FIG. 10).

The reason for such inclination is as follows. Since, as described above, the two outer portions of the reference curve C are parts of the parabola 7 having the focus F1 and the axes of the vertical parabolas set for the points on the parabola 7 are parallel with the x-axis, the right and left side walls 3R and 3L could be made in parallel with the x-z plane if it is assumed that a point light source is placed at the focus F1. However, since the actual light source is a filament having a certain volume (as shown in FIG. 10, a filament 12 is disposed with its central axis along the x-axis), it is necessary to incline, by a certain angle, the right and left side walls 3R and 3L from the planes parallel with the x-z plane.

With this inclination, it can be prevented that rays reflected at points close to the right and left side walls 3R and 3L are again reflected by those side walls. As a result, the entire reflecting surface 4 can serve as the effective surface.

Thus, rays reflected at any points on the reflecting surface 4 travel forward without being reflected again by the side walls 3R and 3L.

Figure 11:
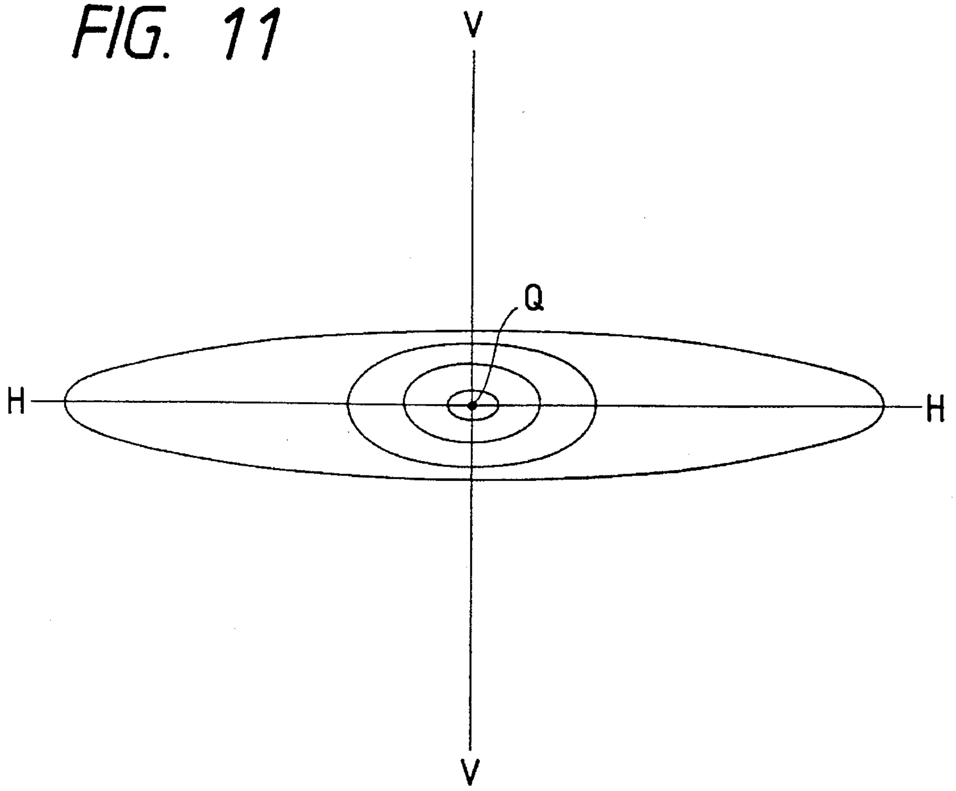
FIG. 11 schematically shows the brightness distribution of a projection pattern of the reflector of the invention.
Figure 14:
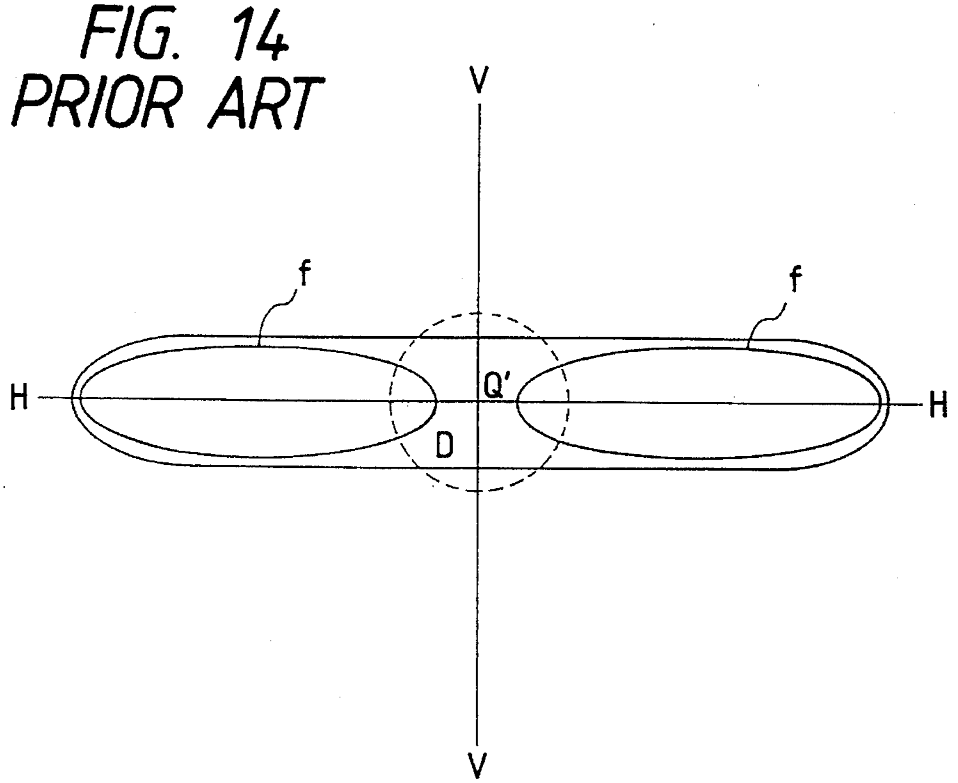
FIG. 14 PRIOR ART
FIG. 14 schematically shows the brightness distribution of a projection pattern of the conventional reflector.
Figure 12:
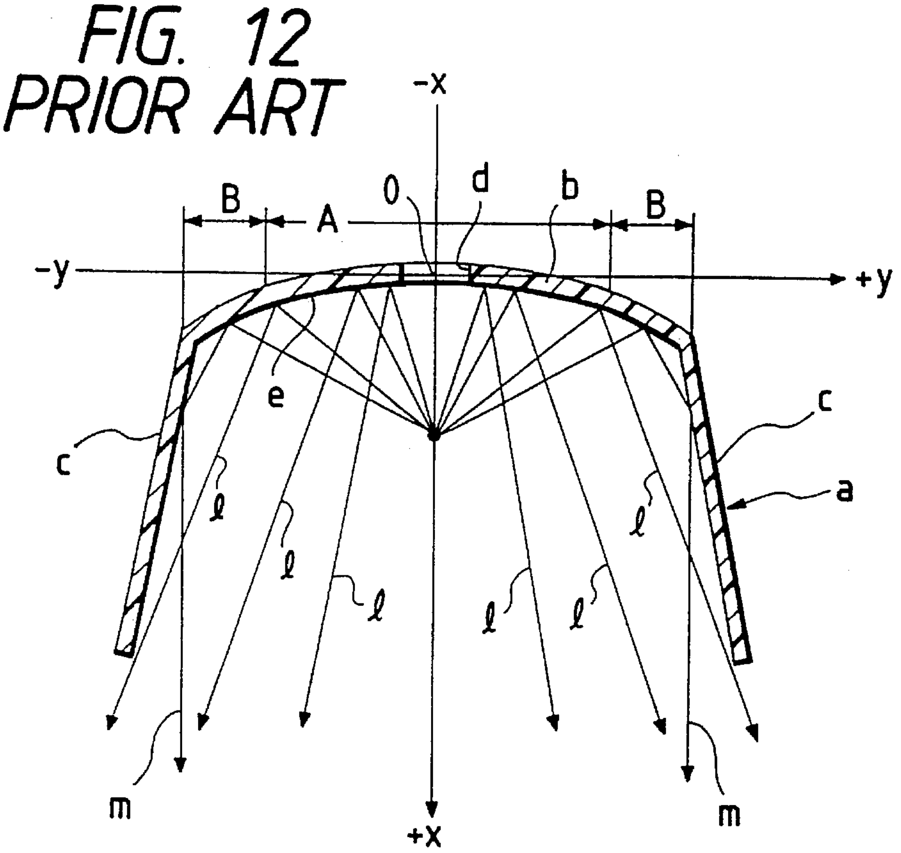
FIG. 12 PRIOR ART
FIG. 12 is a horizontal sectional view of a conventional reflector.
Figure 13:
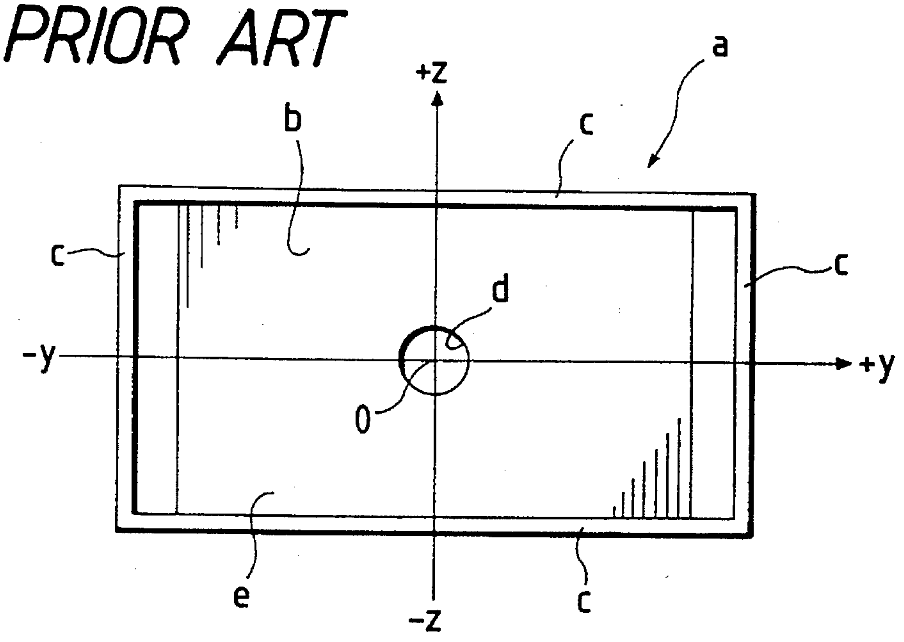
FIG. 13 PRIOR ART
FIG. 13 is a front view of the conventional reflector.

FIG. 11 roughly shows the brightness distribution of a projection pattern by the reflector 1, which includes a high-brightness region having a point o as its center and horizontally diffused regions.

This is because rays reflected at points on the reflecting surface 4 closer to the optical axis is more diffused in the horizontal direction, and rays reflected at points away from the optical axis travel in parallel with the optical axis to contribute to the central brightness of the light distribution pattern.

That is, as shown in FIG. 2, the central brightness of the light distribution pattern is obtained by a superposition of the projection patterns 6R and 6L. Therefore, even if the bulb fixing hole 5 has a relatively large diameter, it does not much decrease the brightness in the vicinity of the point o.

In the above embodiment, the reference curve C is generated by connecting the parabola 7 of the focal length f1 and the parabolas 8 and 9 of the focal length f2 under the common tangential line condition. In general, however, the reference curve may be generated by connecting a large number of parabolas having different focal lengths under the common tangential line condition. Further, it is apparent that the curves set for the respective points on the reference curve are not limited to parabolas, but may be generalized to quadratic curves such as ellipses.

As is apparent from the above description, according to the invention, among rays originating from the focus of the reflecting surface rays reflected at points on the reflecting surface close to the wall portion travel in parallel with the optical axis. Therefore, the secondary reflection by the wall portion can be prevented, and rays reflected by the entire reflecting surface can be effectively utilized to form the light distribution pattern.

Further, rays reflected at points on the reflecting surface closer to the optical axis are more diffused in the horizontal direction, and cross the optical axis to form projection patterns on the front screen. As a result, the central brightness of the light distribution pattern is obtained by a superposition of the two projection patterns due to the respective areas obtained by halving the reflecting surface by the vertical plane including the optical axis. This scheme can prevent the reduction of the central brightness of the light distribution pattern which would otherwise be caused by the bulb fixing hole having a large area relative to the reflecting surface area.

The diffusion angle in the horizontal direction can be controlled continuously for an arbitrary point on the reference curve to form a proper light distribution pattern. It can be assured that the central portion of the light distribution pattern has a prescribed brightness.

What is claimed is:

1. A reflector for a vehicular lamp having a light source, said reflector having a reflecting surface and a wall portion surrounding it and being generally rectangular when viewed from a front side along an optical axis of the reflecting surface, the reflecting surface being defined by:

a reference curve located on a horizontal plane that includes the optical axis of the reflecting surface and formed by connecting parts of a plurality of different parabolas having different focus positions under a first-order continuity condition, the parabola closer to the optical axis having a longer focal length;

a reference focus being located at the focus position of the one of said plurality of parabolas having a shortest focal length; and a quadratic cross-sectional curve obtained by cutting the reflecting surface by a vertical plane which includes a direction vector of a ray originating at said reference focus and being reflected from each point on the reference curve.

2. The reflector of claim 1, wherein the quadratic cross-sectional curve is a parabola.

3. The reflector of claim 1, wherein right and left side walls of the wall portion are inclined, with respect to said optical axis, so that their interval increases toward said front side.

4. The reflector of claim 1, wherein the reflecting surface is symmetrical with respect to a vertical plane including the optical axis.

5. The reflector of claim 1, wherein the vehicular lamp is a fog lamp.

6. A reflector as set forth in claim 1, wherein said plurality of parabolas comprises at least a first parabola having a first focal point on said optical axis, a second parabola having a second focal point off of said optical axis and having a first common tangent with said first parabola, and a third parabola having a third focal point opposite from said first and second focal points and having a second common tangent with said first parabola.

7. A reflector for a vehicular lamp which has a smooth reflecting surface and a wall portion surrounding it and is generally rectangular when viewed from a front side along an optical axis of the reflecting surface, the reflecting surface comprising:

a reference curve located on a horizontal plane including the optical axis of the reflecting surface and formed by connecting parts of at least two different parabolas having different focus positions under a first-order continuity condition;

one of said focus positions being a reference focus located on the optical axis;

a central surface occupying a central area of the reflecting surface in a horizontal direction, said central surface producing diffusing rays which originate from the reference focus, are diffused in the horizontal direction and cross the optical axis after reflection; and an outer surface occupying an outer area of the reflecting surface in the horizontal direction, said outer surface producing reflecting rays which originate from the reference focus and are reflected in directions substantially parallel with the optical axis.

8. The reflector of claim 7, wherein a central portion of the reference curve included in the central surface is formed by a plurality of parts of central surface parabolas having respective axes that are in parallel with the optical axis.

9. The reflector of claim 8, wherein the central surface parabolas have respective focus positions located toward said front side of the reference focus.

10. The reflector of claim 9, wherein the focus positions of the central surface parabolas are symmetrical with respect to the optical axis.

11. The reflector of claim 7, wherein each of the central surface and the outer surface is defined by a plurality of vertical parabolas each parabola being obtained by cutting a paraboloid of revolution with a vertical plane, said paraboloid having a point on the reference curve as its vertex and having an axis disposed in a direction of a ray which originates at the reference focus and is reflected from a point on the reference curve, and said vertical plane including the axis of the paraboloid of the revolution.

12. The reflector of claims 6, wherein the vehicular lamp is a fog lamp.

* * * * *